United States Patent [19]
Afghahi

[11] Patent Number: 6,111,242
[45] Date of Patent: *Aug. 29, 2000

[54] IMAGING SYSTEM WITH GAIN AND ERROR CORRECTION CIRCUITRY

[75] Inventor: Morteza Afghahi, Tempe, Ariz.

[73] Assignee: Intel Corporation, Santa Clara, Calif.

[ * ] Notice: This patent is subject to a terminal disclaimer.

[21] Appl. No.: 09/002,367

[22] Filed: Jan. 2, 1998

[51] Int. Cl.[7] .................................................. H01L 27/00
[52] U.S. Cl. ........................................ 250/208.1; 348/308
[58] Field of Search ........................ 250/208.1; 348/294, 348/296, 297, 302, 307, 308, 309; 327/514, 515

[56] References Cited

U.S. PATENT DOCUMENTS 5,471,515  11/1995  Fossum et al. .
5,877,715   3/1999  Gowda et al. ............................ 348/294

OTHER PUBLICATIONS

J.E.D. Hurwitz, Peter B. Denyer, Donald J. Baxter, Graham Townsend, "*An 800K–Pixel Color CMOS Sensor for Consumer Still Cameras,*" SPIE vol. 3019, pp. 115–124 (1997).

Sunetra K. Mendis, Sabrina E. Kemeny, Russell C. Gee, Bedabrata Pain, Quiesup Kim and Eric R. Fossum, "*Progress in CMOS Active Pixel Image Sensors,*" SPIE vol. 2172, pp. 19–29 (1994).

*Primary Examiner*—Seungsook Ham
*Assistant Examiner*—Kevin Pyo
*Attorney, Agent, or Firm*—Blakely, Sokoloff, Taylor & Zafman LLP

[57] ABSTRACT

Imaging system with gain and error correction circuitry particularly suitable for metal-oxide-semiconductor (MOS) image sensors. The correction circuitry allows the analog output signal for an active pixel to substantially track an input signal in the pixel. Voltage dependent distortion and attenuation in the output signal, with respect to the input signal, is minimized, without significantly increasing the size of each pixel.

20 Claims, 6 Drawing Sheets

IMAGING SYSTEM WITH GAIN AND ERROR CORRECTION CIRCUITRY

BACKGROUND INFORMATION

This invention is generally related to imaging systems and more particularly to gain and error correction in image sensors.

The image sensor is at the heart of all modern electronic imaging systems, including such consumer products as video cameras, copiers, scanners, and, more recently, digital cameras. In an imaging system, the image sensor is exposed to an object or changing scene to electronically capture image frames. These frames can then be processed using a variety of analog and digital image processing techniques to yield video or still images of the object or changing scene.

Figure 1:
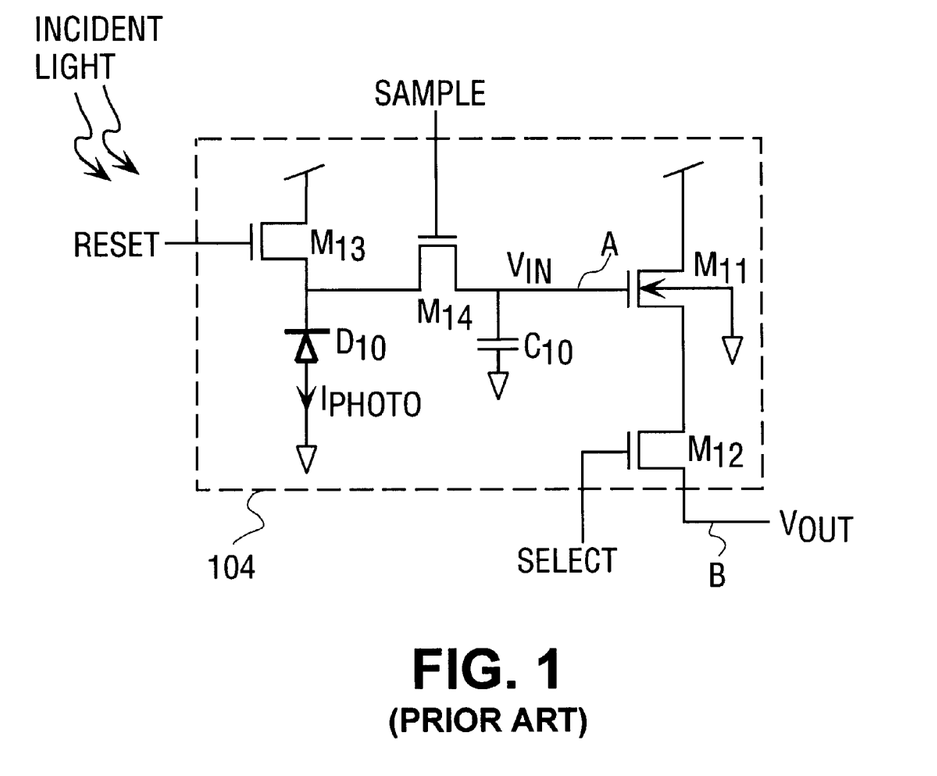
FIG. 1 illustrates a prior art pixel.

Modern electronic image sensors are built using different semiconductor technologies, including charge coupled device (CCD) and metal oxide semiconductor (MOS) fabrication processes. Different examples of image sensors are discussed in "An 800K-Pixel Color CMOS Sensor for Consumer Still Cameras," by J. E. D. Hurwitz, P. B. Denyer, D. J. Baxter, and G. Townsend, SPIE Vol. 3019, pages 115–124, and "Progress in CMOS Active Pixel Image Sensors," by S. K. Mendis, S. E. Kemeny, R. C. Gee, B. Pain, Q. Kim, and E. R. Fossum, SPIE Vol. 2172, pages 19–29. The image sensor typically employs an array of active pixels that are exposed to light reflected from the object or scene. Each active pixel includes photodetecting circuitry and related storage and control circuitry that converts incident light into analog electrical signals. For example, FIG. 1 illustrates in relevant part a typical prior art active pixel 104. The pixel 104 uses MOS circuit elements such as the field effect transistor (FET) and implements an electronic shutter as described below.

The following short cuts are used in this disclosure to describe various operating regions of the MOS field effect transistor (FET). An FET is said to be "turned off" when $V_{GS}$ (gate-source voltage) $\leq V_T$ (threshold voltage) for the device and the device is operating in the cut-off region where its channel acts as an open circuit. When a FET is "turned on", $V_{GS} > V_{dT}$, $V_{DS}$ (drain-source voltage) is normally small and the device is operating in the non-saturation region.

Turning now to FIG. 1, the prior art pixel 104 includes a photodiode $D_{10}$ and a RESET transistor $M_{13}$ coupled to a storage capacitor C10 via a SAMPLE transistor $M_{14}$. The pixel 104 operates in response to RESET and SAMPLE signals being used to turn on $M_{13}$ and $M_{14}$ which causes the voltage at node A ($V_{IN}$) to rise to a reset value. When the desired object or scene comes into view of the image sensor, a timer (exposure timer, not shown) is triggered and $M_{13}$ is turned off. Thereafter, photo-generated electron-hole pairs in $D_{10}$ cause a photocurrent (light-generated signal) Iphoto which discharges the capacitor $C_{10}$ through $M_{14}$ and consequently results in $V_{IN}$ decaying. When the timer reaches a predetermined point, $M_{14}$ is turned off, leaving an exposed value for $V_{IN}$ on $C_{10}$. $M_{14}$ thus acts as an electronic shutter in limiting the light energy detected by the pixel. The difference between the reset value of $V_{IN}$ and the exposed value, together with the exposure or "integration" time defined by the timer, gives a measure of the incident light energy detected by the pixel.

To read the information in the reset and exposed values, the prior art pixel 104 includes a pixel output stage having $M_{11}$ and $M_{12}$. $M_{11}$ is used as an amplifier whereas $M_{12}$ is a switch. These two devices can be considered to be part of the readout circuitry in the pixel. The pixel readout circuitry together with a load (not shown) on node B form an amplifier in a source follower configuration having a voltage gain less than one but a current gain greater than one when an ADDRESS signal is applied that turns on $M_{12}$. When that happens, an analog signal $V_{OUT}$ representative of $V_{IN}$ and hence the incident light energy may be read from the pixel. An example of an active pixel with associated readout circuitry is discussed in U.S. Pat. No. 5,471,515, "Active Pixel Sensor With Intra-Pixel Charge Transfer," to Fossum et al.

For a pixel having ideal read-out circuitry, $V_{OUT}$ will equal $V_{IN}$ (voltage gain of exactly one) for the entire range of $V_{IN}$. However, for an actual prior art pixel such as pixel 104, $V_{OUT}$ is a non-linear function of $V_{IN}$. Any non-linearity or deviation from the ideal presents an additional problem for the imaging system designer to deal with, as the detected image deviates from the actual scene. Such deviations are particularly undesirable in high end imaging systems such as the digital camera.

The non-linearity in $V_{OUT}$ is known as gain distortion and may be caused by $V_T$ modulation, where the gain of $M_{11}$ in the readout circuitry is modulated in response to a changing threshold voltage $V_T$ of $M_{11}$. This occurs because $M_{11}$ is implemented as a n-channel FET in a P-substrate, where the P-substrate is connected to zero potential or ground. The source to substrate (bulk) voltage for $M_{11}$ in this configuration is non-zero and changing for different values of $V_{OUT}$. As a result, $V_T$ for $M_{11}$ and therefore its gain is changing as a function of $V_{OUT}$.

The prior art pixel 104 also suffers from reduced dynamic range, particularly at the low end where $V_{IN}$ approaches 1 volt. $V_{OUT}$ cannot follow such low input voltages due to the gate-source drop across $M_{11}$ and the drain-source drop across $M_{12}$.

In addition to gain distortion discussed above, the output signals of pixels in an imaging array are susceptible to errors (small differences between design and actual values). These may be caused by manufacturing variations among the pixels in the array and by readout noise originating in the signal path beyond the source node of $M_{11}$ and magnified when referred back to node A.

To deal with such errors, a technique known as correlated double sampling (CDS) in the field of image sensor technology may be used to cancel first order errors due to device mismatches as between pixels in the manufactured sensor array and due to readout noise. Cancellation is achieved by correlating or subtracting a "dark image" output voltage (obtained for $V_{IN}$ being the reset value) from the "desired image" output voltage (when $V_{IN}$ is the exposed value) for each pixel. However, such a technique may not sufficiently correct higher order errors and errors due to gain distortion, particularly voltage-dependent gain distortion such as $V_T$ modulation.

In view of the above, it would be desirable to have a novel imaging system which may correct for some or all of the above disadvantages. Also, as the typical image sensor can employ in excess of several hundred thousand pixels, the improved imaging system should keep pixel size as physically small as possible, so as to keep the image sensor compact and permit greater image resolution through the use of a larger number of pixels.

SUMMARY

The invention in one embodiment is directed at an imaging apparatus having a number of correction circuits, each being associated with a set of pixels. Each pixel has readout circuitry with a first device receiving an input signal related to a light-generated signal. The correction circuit associated with the pixel provides an output signal that is linearly proportional to the input signal in response to the first device in the readout circuitry and a second device in the correction circuitry conducting substantially the same amount of current.

BRIEF DESCRIPTION OF THE DRAWINGS

The above briefly summarized aspects and features of the invention may be better understood by referring to the detailed description, the claims, and the drawings below where:

DETAILED DESCRIPTION

As briefly summarized above, the invention is directed an imaging system having a novel image sensor that allows a more faithful representation of each pixel's light-generate information. In a particular embodiment, correction circuitry shared by a group of pixels has devices that are replicates of those in a pixel's readout circuitry. The correction circuit provides an output signal that is linearly proportional to an input signal of a selected pixel in response to conducting the same amount of current as the readout circuitry.

The various embodiments of the correction circuitry can help reduce errors (differences in circuit operation between design and actual values) due to device mismatching between pixels, as well as provide more linear unity gain in the sensor output signal. The correction circuitry can be located outside of each pixel and is shared by a group of pixels to keep each pixel small.

For purposes of explanation, specific embodiments are set forth below to provide a thorough understanding of the invention. However, as understood by one skilled in the art, from reading this disclosure, the invention may be practiced without such details. Furthermore, well-known elements, devices, process steps, and the like, are not set forth in detail in order to avoid obscuring the invention.

Figure 2:
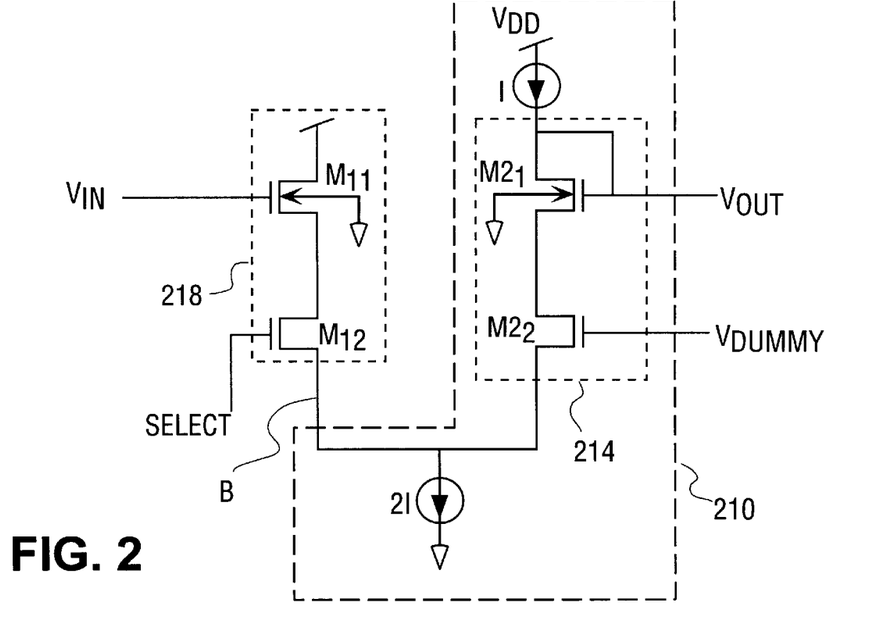
FIG. 2 is a schematic of a first embodiment of the invention as an image sensor circuit.

FIG. 2 illustrates a first embodiment of the invention as a pixel 204 (photodetecting circuitry not shown) to be used in an image sensor. The pixel 204 is associated with an output node B. A correction circuit 210 is also coupled to node B. The correction circuit 210 includes an output stage 214 that has devices which are replicates, i.e., have matching physical characteristics, with those in the pixel's readout circuitry 218. For instance, where the readout circuitry 218 includes a pixel amplifying device such as n-channel FET $M_{11}$, the output stage 214 includes a corresponding output amplifying device being n-channel FET $M_{21}$ which is a replicate of $M_{11}$. In addition, the pixel output stage 218 includes a pixel switching device such as n-channel FET $M_{12}$, corresponding to a replicate FET $M_{22}$ in the output stage 214. The matching physical characteristics of the replicate FET devices include matching channel width and length.

The readout circuitry receives an input signal $V_{IN}$ at the gate of $M_{11}$, where the signal $V_{IN}$ can be related to a light-generated signal e.g., photocurrent, created by a photodetecting circuit such as the one described above in the background. The readout circuitry, in response to receiving $V_{IN}$ and the SELECT signal as a pixel select signal at the gate of $M_{12}$, will cause an intermediate signal to develop at node B at which there is a current sink of value 2*I, where I is the value of current forced in the devices of correction circuit 210. In this particular embodiment, the readout circuitry, and more specifically the pixel amplifying device $M_{11}$, is functioning as a source follower, although other output stages may be possible for the pixel 204.

A system incorporating the correction circuitry 210 should be designed to generate a signal $V_{DUMMY}$ which mimics the SELECT signal applied to $M_{12}$, particularly when $M_{12}$ is turned on in response to SELECT. When turned on, the corresponding switching devices $M_{12}$ and $M_{22}$ provide a low impedance path between the source of $M_{11}$ and $M_{21}$, respectively, and the pixel output node B in response to the SELECT signal and $V_{DUMMY}$. The SELECT and $V_{DUMMY}$ signals may be generated according to known digital techniques in the art. In a particular embodiment, $V_{DUMMY}$ can simply be tied to the positive supply $V_{DD}$ which approximates a logic high level in SELECT.

The above described components of the pixel and correction circuitry operate to provide a voltage follower effect in that $V_{OUT}$ is linearly proportional to and substantially tracks $V_{IN}$, i.e., $0.97 V_{IN} \leq V_{OUT} \leq V_{IN}$ for a wide range of $V_{IN}$. This desirable effect may be explained by the following observations.

The correction circuitry 210 features control circuitry in the form of current source I and current sink 2I as shown in FIG. 2. When the two currents have been set as I and 2I, the current through the pixel output stage 218, i.e., the current through devices $M_{11}$ and $M_{12}$, is also forced to be I in order to satisfy Kirchoff's Current Law at node B. As both the readout circuitry and the output stage 214 thus conduct the same amount of current, and since both have replicate devices with matching physical and operating characteristics, including both having the same gate-to-source voltage on the switching devices $M_{12}$ and $M_{22}$, then it can be expected that $V_{OUT}$ being the gate voltage of device $M_{21}$ is substantially the same as $V_{IN}$ which is the gate voltage of corresponding device $M_{11}$.

Any differences between the two legs feeding the current sink 2I may contribute to a difference between $V_{IN}$ and $V_{OUT}$. These differences include the voltage drop across the current source I and the fact that $M_{21}$ is diode-connected while $M_{11}$ is not. To make the left leg of the circuit more similar to the right leg, and thereby improve the tracking of $V_{OUT}$, the current source I may be implemented using FET devices which have large channel width-to-length (W/L) ratios so as to reduce their $V_{DS}$ voltage drop and thus reduce the drop across the current source I.

For improved dynamic range in the output signal of pixel 204, the transistors $M_{11}$ and $M_{21}$ should be designed such that the transistors are operating in their active region for as much of the range of $V_{IN}$ as possible. Similarly, transistors $M_{12}$ and $M_{22}$ should be designed such that each is turned off and turned on in response to the SELECT and $V_{DUMMY}$ signals, where $V_{DUMMY}$ mimics SELECT as much as possible when $M_{12}$ is turned on. As mentioned earlier, $V_{DUMMY}$ can be kept constant at $V_{DD}$ to reduce the complexity of the timing signal generation circuitry used for creating the various control signals RESET, SAMPLE, and SELECT for the pixel. Maintaining $V_{DUMMY}$ at a constant value does not adversely affect operation as $V_{OUT}$ can still be sampled when the SELECT signal turns on $M_{12}$.

Figure 5:
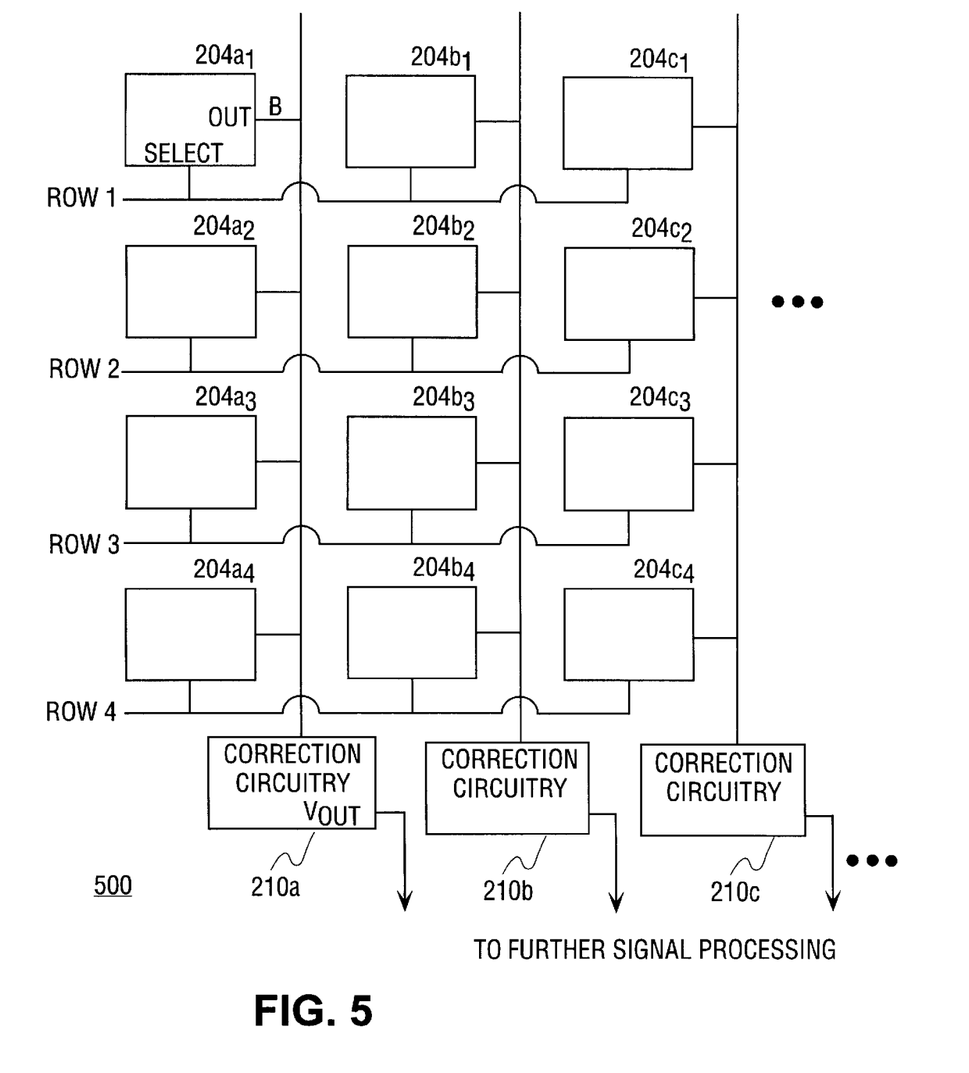
FIG. 5 is a block diagram of an image sensor embodiment of the invention.
Figure 6:
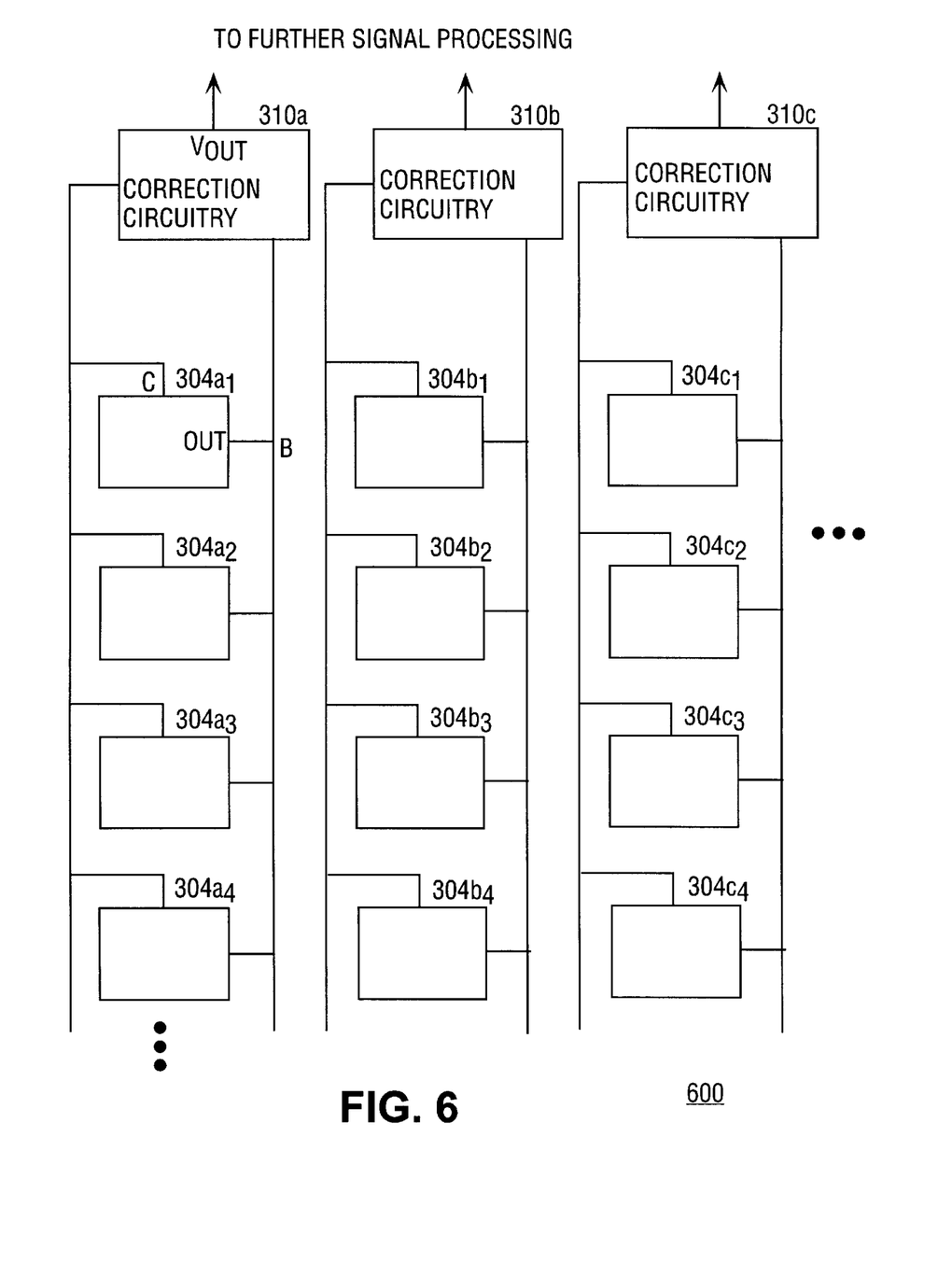
FIG. 6 is a block diagram of a second sensor embodiment of the invention.

The current I should be selected in view of power consumption and noise immunity requirements for the sensor circuit as a whole, especially since the correction circuitry is duplicated for each column of pixels, as seen in FIGS. 5 and 6 below. The current I, however, should, at the same time, be able to provide enough drive for the subsequent stage of analog processing beyond the correction circuitry 210.

Although the embodiment of the invention in FIG. 2 features FETs having their substrate (or bulk) connections being grounded, the circuit should operate properly even if the substrate is directly connected to the source of each transistor and may otherwise be floating.

Figure 3:
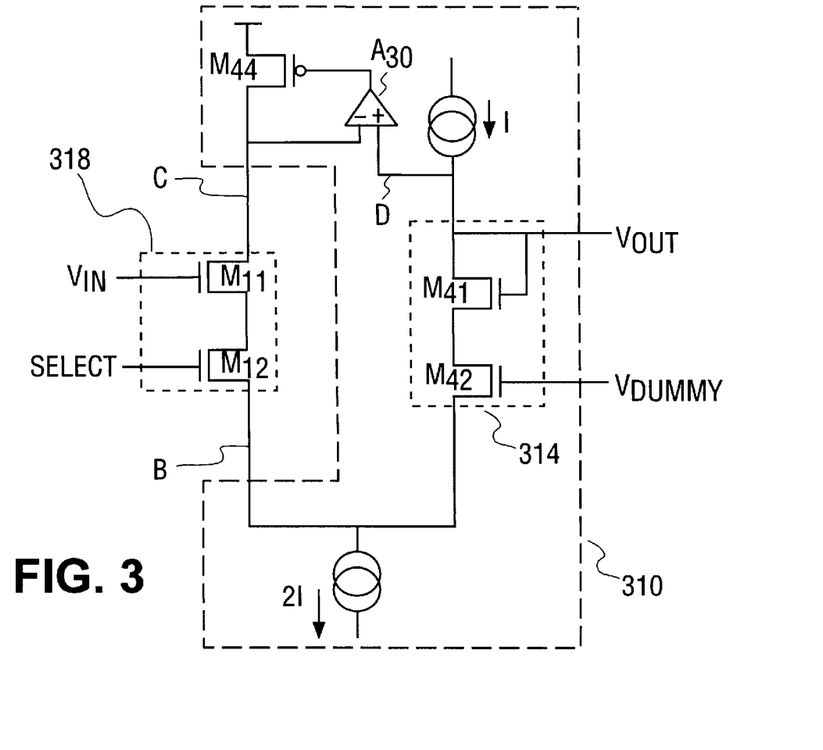
FIG. 3 is a second embodiment of an image sensor circuit according to the invention.

To further improve the fidelity between $V_{OUT}$ and $V_{IN}$, FIG. 3 illustrates a second embodiment of the invention as correction circuitry 310 coupled to readout circuitry 318. In this embodiment, the correction circuitry 310 includes a control circuit coupled to the readout circuitry 318 at node C and to the output stage 314 at node D. The control circuit includes an operational amplifier (opamp) $A_{30}$ driving a gate of a FET $M_{44}$ with negative feedback from node C. This configuration causes the potential at node C to track the one at node D, and helps correct higher order errors due to the voltage drop in current source I and mismatches between corresponding devices in the readout circuitry 318 and in the output stage 314.

As a simpler but less accurate alternative to the control circuit in correction circuit 310, the opamp $A_{30}$ may be eliminated and instead $M_{44}$ may be designed to conduct the current I when connected as a diode.

Figure 4:
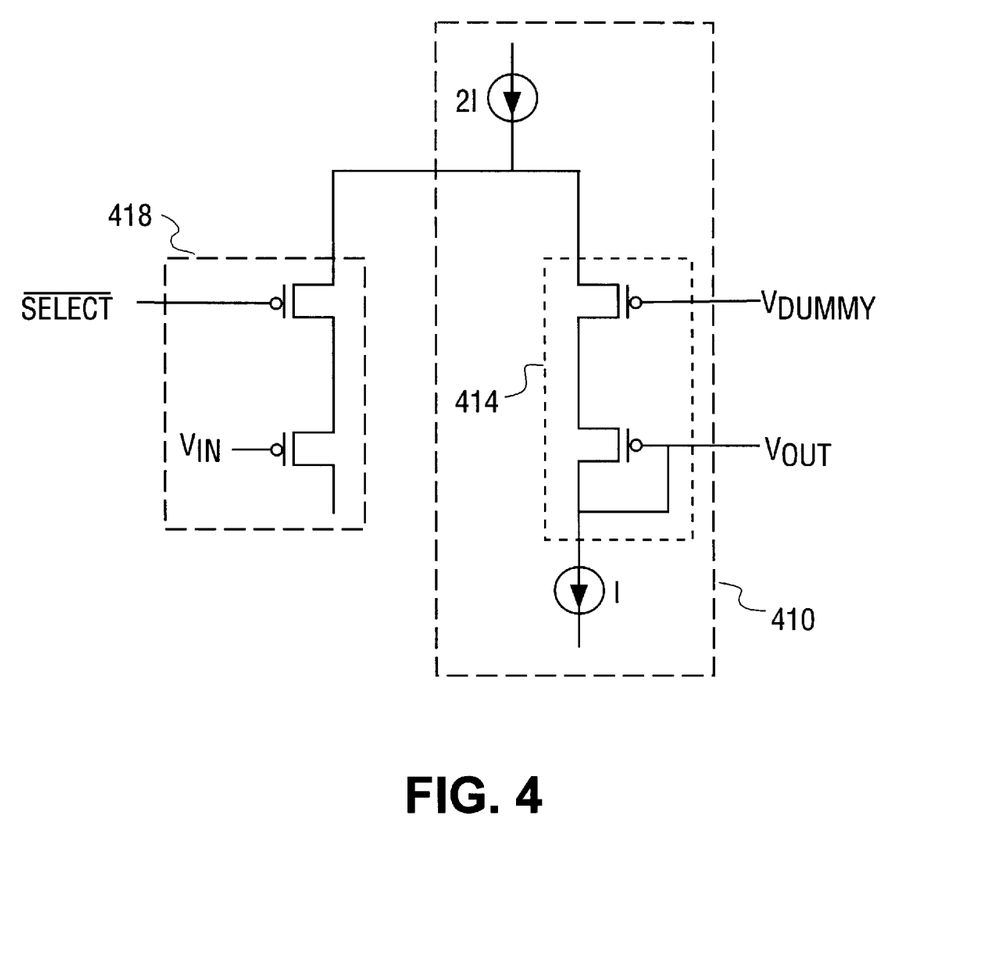
FIG. 4 is a third embodiment of a pixel and correction circuitry according to another embodiment of the invention.

The above embodiments of the pixel and correction circuitry were described as MOS circuits which can be built using n-channel FETs built in a p-substrate. FIG. 4 shows yet another embodiment of the pixel and correction circuitry, this time using p-channel FET devices in both readout circuitry 418 and correction circuitry 410. The operation of the circuit in FIG. 4 can be understood by one skilled in the art using the descriptions above for the n-channel embodiments in FIGS. 2 and 3, and therefore is not further discussed in the same detail. It should be noted that in the p-channel embodiment, $V_{DUMMY}$ can now be directly connected to ground to mimic $\overline{ADDRESS}$ when used for reading $V_{OUT}$.

A different embodiment of the invention, this time as an image sensor 500 is shown in FIG. 5. The sensor features an array of pixels 204a, 204b, . . . arranged as rows and columns. To reduce the space taken on a signal integrated circuit die that contains both the pixels and correction circuitry of the sensor, the pixels in each column of the array are coupled to a single correction circuit 210a, 210b, 210c, . . . , respectively. The sensor 500 can be implemented as a CMOS IC, including the correction circuits 210a, 210b, . . . . The pixels are multiplexed in response to ROW signals, so that the $V_{OUT}$ at the correction circuitry may be read one row at a time. The image sensor 500 can be coupled to conventional analog-to-digital (A/D) conversion circuitry which results in raw image data being produced in response to analog $V_{OUT}$ signals received from the correction circuitry. The A/D conversion circuitry can also be included on the same IC die as the pixels, but need not be. Although shown as being row multiplexed, the pixels can also be column multiplexed where the pixels in a given row receive the same correction circuitry.

FIG. 6 illustrates yet another embodiment of the image sensor 600 as an array of pixels 304a, 304b, 304c, . . . each containing readout circuitry 318 (see FIG. 3). Once again, to obtain a more compact sensor circuit, each pixel in a column is connected to its respective node C and a node B, which nodes are also coupled to a single correction circuit 310a, 310b, 310c, (see FIG. 3) . . . for the column. Similar to the sensor 500, the sensor 600 provides analog output signals $V_{OUT}$ which are forwarded to A/D conversion circuitry and further signal and image processing functions described in connection with FIG. 7 below. Keeping the correction circuitry outside the pixels and shared by a column allows the image sensor as a whole to be kept small and provides greater resolution through the use of a large number of tightly packed pixels. Again, although shown as column circuitry, the invention may also be realized as row circuitry where pixels in each row are coupled to a respective correction circuit.

Figure 7:
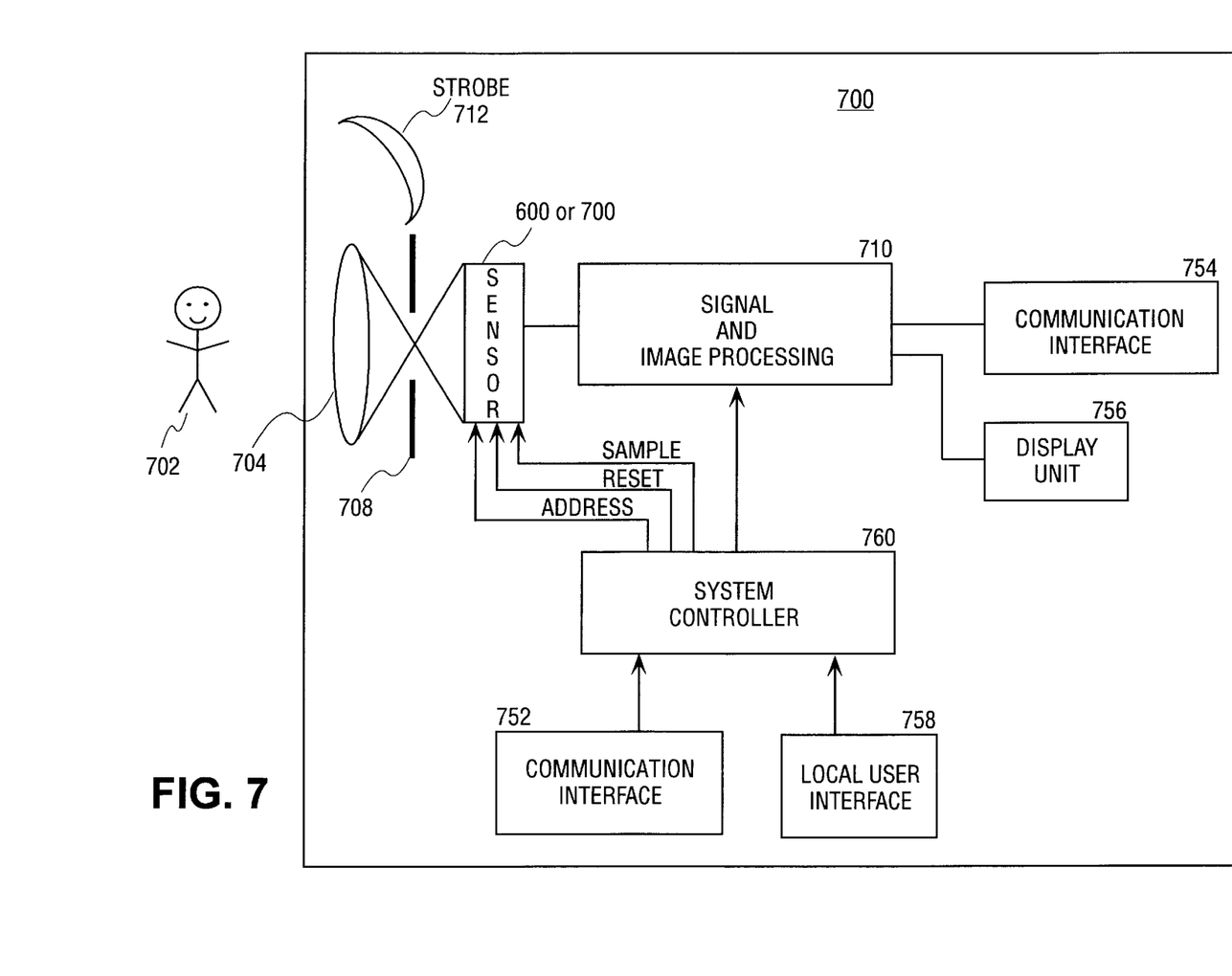
FIG. 7 is a logical block diagram of an imaging system according to another embodiment of the invention.

FIG. 7 is a logical block diagram of an imaging system or apparatus 700, such as a digital camera, as an embodiment of the invention that features the sensors 500 or 600 previously described. The apparatus can be used to acquire digital still and motion images. The imaging apparatus features an optical system including a lens system 704 and perhaps an aperture 708 for receiving incident light reflected from a subject 702, and focusing the light to form an image of the subject on the sensor. The control signals such as RESET, SAMPLE, and $\overline{SELECT}$ used in the operation of the image sensor, can be generated by a system controller 760. The controller 760 may include a microcontroller or a processor with input/output (I/O) interfaces that generates the control signals in response to instructions stored in a non-volatile programmable memory, or firmware. Alternatively, a logic circuit that is tailored to generate the control signals can be used.

In addition to generating the signals needed for controlling the sensor, the system controller also manages the operation of the imaging apparatus as a whole. The system controller can act in response to direct mechanical user input via the local user interface 758 (as when a user pushes a button or turns a knob of the apparatus 700), or to control signals received from a communication interface 752, where the user can invoke commands via a control panel displayed on a host computer which communicates with the apparatus through the interface 752.

A signal and image processing block 710 may be included to perform analog-to-digital (A/D) conversion (if not done in the sensor IC) on the analog output signals from the sensor, as well as perhaps further digital signal and image processing functions for transforming raw pixel data into a captured image having a predefined resolution. The image processing functions if provided can be implemented as logic circuitry and/or a programmed processor responding to software, to perform one or more of various known image processing tasks, such as pixel correction, color correction and companding, scaling, and compression to prepare data representing the capture image.

A second communication interface 754 (which can be the same as interface 752) having a suitable transmission bandwidth is normally included for transferring the digitized sensor signals to an image processing and/or viewing system such as a host computer or Personal Computer (PC) separate from the imaging apparatus 700. The interfaces 752 and 754 can be configured according to a computer peripheral bus standard such as Universal Serial Bus (USB) or the higher performance IEEE 1394-1995. The digitized sensor signals and image data can also be transferred to the host/PC using optional removable storage devices (not shown) aboard the apparatus 700. Such local storage devices may include, for example, a removable non-volatile memory card.

Rather than transferring the image data to another system for viewing, the imaging apparatus 700 itself can optionally contain a display means 756 for displaying the captured image. For instance, the imaging apparatus may be a portable digital camera having a small liquid crystal display (LCD) or other suitable low power display for temporarily showing the captured image data shortly after being taken. In another embodiment, the display would be a desktop monitor or a notebook display which receives image data from the apparatus being a videoconferencing device.

To summarize, the embodiment of the invention described above is directed at an imaging system having a novel image sensor in which correction circuitry is coupled to each group of pixels associated with a pixel output node. The correction circuitry sets a first current through an output stage, where the output stage has devices that are replicates of those in each pixel's readout circuitry. A second current twice the first is set through both the readout circuitry and output stage, such that the same amount of current is forced through both. In this way, the correction circuitry can provide an output signal that is linearly proportional and that substantially tracks an input signal in the pixel.

Of course the embodiments described above are subject to some variations in structure. For instance, the correction circuitry can be used with pixels having a wide range of photodetecting circuitry based on devices such as photogates and photodiodes. Therefore, the scope of the invention should be determined not by the embodiments illustrated but by the appended claims and their legal equivalents.

What is claimed is:

1. An imaging apparatus comprising:
   a set of pixels arranged as groups, each group associated with a corresponding pixel output (PO) node, each pixel having readout circuitry with a first device receiving an input signal related to a light-generated signal;
   a set of correction circuits each one associated with a corresponding one of said groups and coupled to the corresponding PO node, each correction circuit having an output stage with a second device being a replicate of the first device and configured to provide an output signal that is linearly proportional to the input signal of one of said plurality of pixels in the corresponding group and that represents an image.

2. An imaging apparatus as in claim 1 wherein the second device is conducting the same amount of current as the first device.

3. An imaging apparatus as in claim 1 wherein the set of pixels are arranged as an array having rows and columns, each of said group of pixels forming a column of the array, and wherein the output signal is provided in response to a select signal being applied to the readout circuitry of the pixel.

4. An imaging apparatus as in claim 1 further comprising a control circuit coupled to the readout circuitry of the pixel in the group and to the output stage in the correction circuitry to cause a first node of the readout circuitry to track a corresponding second node of the output stage.

5. An imaging apparatus as in claim 1 further comprising analog-to-digital conversion unit for converting the output signal of each correction circuit into digital signals; and logic circuitry configured to provide digital image captured data in response to the digital signals received from the analog-to-digital conversion unit.

6. An imaging apparatus as in claim 1 wherein the first device comprises a first FET receiving the input signal, and wherein the second device comprises a second FET providing the output signal, the first and second FETs being replicates.

7. An imaging apparatus as in claim 1 wherein the correction circuitry comprises:
   first control circuit for setting a first current in the output stage, and
   second control circuit coupled to the PO node for setting a second current at the PO node.

8. An imaging apparatus as in claim 7 where the first control circuit comprises a current source and the second control circuit comprises a current sink.

9. An imaging apparatus as in claim 6 wherein each of the first and second FETs is an n-channel FET formed in a P-type semiconductor substrate.

10. An imaging apparatus as in claim 7 wherein the second current has a value twice that of the first current.

11. An imaging apparatus as in claim 1 wherein the output stage provides the output signal in response to a dummy signal having a level that matches one in a select signal applied to the readout circuitry.

12. An imaging apparatus as in claim 4 wherein the control circuit comprises an operational amplifier having inputs coupled to the readout circuitry and the output stage, and output driving a signal input of a transistor to control the first node.

13. An imaging apparatus as in claim 7 further comprising a load in series with the readout circuitry, for providing a voltage drop corresponding to a drop across the first control circuit.

14. A digital camera comprising:
   a set of pixels arranged as groups, each group associated with a corresponding pixel output (PO) node, each pixel having readout circuitry with a first device receiving an input signal related to a light-generated signal;
   a set of correction circuits each one associated with a corresponding one of said groups and coupled to the corresponding PO node, each correction circuit having an output stage with a second device being a replicate of the first device and configured to provide an output signal that is linearly proportional to the input signal of one of said plurality of pixels in the corresponding group; and
   signal processing circuit for converting the output signal of each correction circuit into image data; and
   communication interface for transferring the image data to an image processing system.

15. A digital camera as in claim 14 further comprising a display unit for displaying the captured image data.

16. A digital camera as in claim 15 wherein the display unit comprises an LCD.

17. A digital camera as in claim 14 further comprising a storage device for receiving and storing the captured image data.

18. A digital camera as in claim 17 wherein the storage device comprises a removable memory card.

19. A digital camera as in claim 14 further comprising a controller for managing operations of the imaging apparatus in response to instructions stored as firmware.

20. A digital camera as in claim 19 wherein the controller generates a plurality of control signals including a pixel select signal for controlling operation of each pixel.

* * * * *